United States Patent [19]

Kasten

[11] 3,769,780
[45] Nov. 6, 1973

[54] PARTICLE FILTER-SOUND MUFFLER
[75] Inventor: Walter Kasten, Franklin, Mich.
[73] Assignee: The Bendix Corporation, Southfield, Mich.
[22] Filed: Nov. 23, 1971
[21] Appl. No.: 201,481

[52] U.S. Cl.......................... 55/276, 55/463, 55/482
[51] Int. Cl............................................ B01d 46/24
[58] Field of Search...................... 55/276, 482, 484, 55/486, 489, 510, DIG. 30, 463

[56] References Cited
UNITED STATES PATENTS
3,129,078   4/1964   Hobbs........................ 55/DIG. 30 X
3,209,857   10/1965   Eckel................................ 55/276 X
3,521,429   7/1970   Leffler................................. 55/276

FOREIGN PATENTS OR APPLICATIONS
882,647   11/1961   Great Britain........................ 55/482

Primary Examiner—Frank W. Lutter
Assistant Examiner—William Cuchlinski, Jr.
Attorney—John S. Bell et al.

[57] ABSTRACT

An inflatable safety cushion device for protecting vehicle passengers that includes a filter-muffler for removing any potentially harmful particles from air flowing into an inflating bag, and for reducing the noise level of the inflating air flow. The filter-muffler comprises a first cylindrical filter element encircling a second cylindrical filter element. A perforated, hexagonal, metallic tube is disposed between the two cylindrical filter elements. The sides of this hexagonal tube cooperate with the inner surface of the outer cylindrical filter element to define six open spaces or chambers. The velocity of air flowing through perforations in the hexagonal element is reduced as the air enters an open chamber. This velocity reduction reduces the noise level of the air flow. The hexagonal element is elastically deflected by a high velocity pulse of air passing through the filter-muffler. This deflection absorbs energy and further reduces the noise level of the air flow.

5 Claims, 4 Drawing Figures

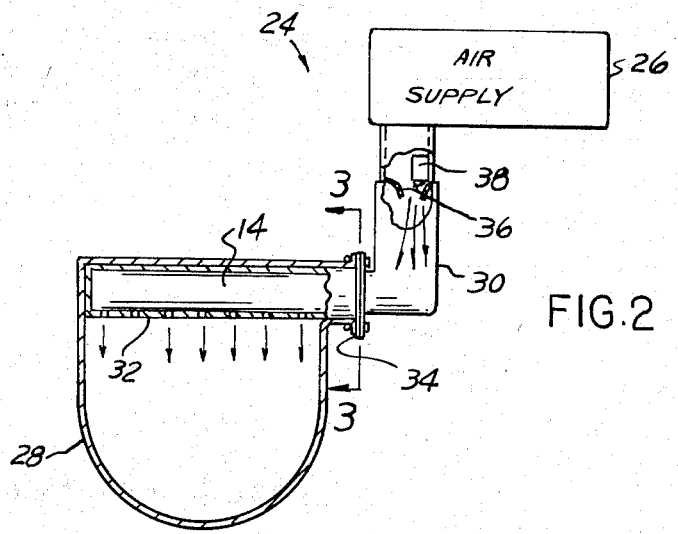
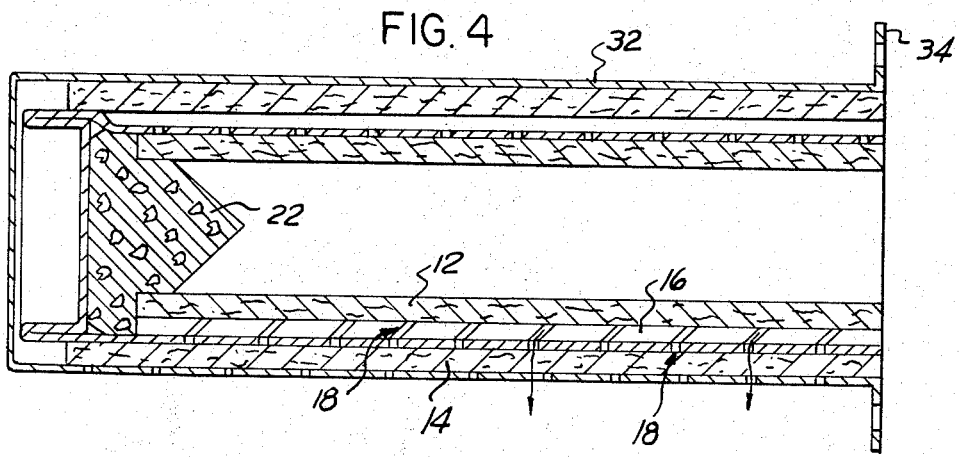
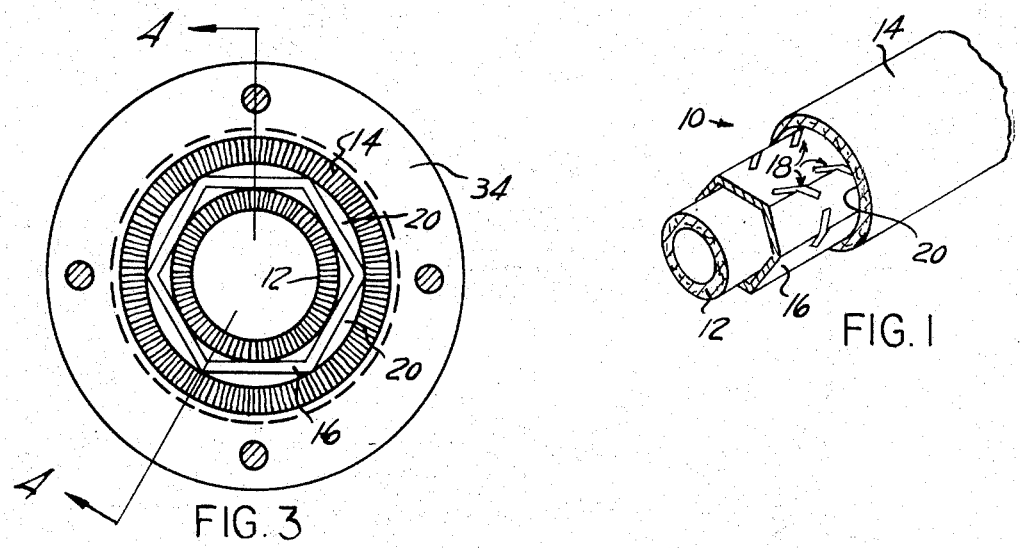

PARTICLE FILTER-SOUND MUFFLER

BACKGROUND OF THE INVENTION

1. Field of the Invention

Filter-muffler devices for filtering and reducing the noise level of a high velocity, pulse type air flow such as the flow of air to an inflatable safety cushion for protecting automobile passengers during a collision.

2. Brief Description of the Prior Art

Safety cushions that inflate during a collision of an automobile to protect passengers are well known and commonly called "safety air bags." The inflatable bag is connected to an air supply which inflates that bag very quickly during a collision. The air supply is separated from an uninflated bag by a metallic wall or diaphragm which is ruptured in order to initiate inflation of the bag. The rupturing of this metal diaphragm introduces small metallic fragments into the inflating air flow which must be removed from that flow in order to protect vehicle passengers. In addition, the bag must be inflated in such a short time that the air is required to flow at a high velocity that causes the flow to be extremely noisy. The noise of a triggering "air bag" has been one of the most frequently expressed objections to the use of these devices.

SUMMARY OF THE INVENTION

This invention includes a filter-muffler for removing any harmful particles from an air or gaseous flow that also reduces the noise level of that flow. The filter-muffler comprises a first cylindrical filter element for removing particles from a gas flow that is encircled by a second, larger cylindrical filter element. The inner diameter of the second filter element is larger than the outer diameter of the first. A multi-sided perforated tube or conduit is disposed between the two cylindrical filter elements to hold them in a spaced apart relationship. The sides of the perforated tube cooperate with the surface of one of the filter elements to define a plurality of expansion chambers for receiving gaseous flow passing through the perforated element. The gas expands as it enters an expansion chamber, and the flow velocity of the gas is reduced. This velocity reduction reduces the noise level of the gas flow. The multi-sided, perforated tube is formed from an elastic material that is deflected by a short duration gaseous flow. This deflection absorbs energy and thereby further reduces the noise level of a short duration flow such as a pulse of air.

The invention also comprises an inflatable safety cushion device or system in which the above-described filter-muffler is disposed in a conduit or tube for transmitting air from an air supply to an inflatable bag or cushion. The filter-muffler is disposed in the conduit so that air flows in an in-to-out direction through the filter-muffler into the inflatable safety cushion. The walls of the filter-muffler are porous so that air flows into the inflating bag from all positions on the filter-muffler. The filter-muffler thus diffuses air flowing into the inflating bag and minimizes any possibility that the air flow might rupture the bag. As explained previously, small metal fragments are introduced into the air flow when the air supply is triggered to initiate inflation of the safety cushion. These potentially harmful metal fragments are removed from the air flow by the cylindrical filter elements of the above-described filter-muffler. The conduit connecting the filter-muffler to the air supply transmits a portion of the air flowing from that supply into the center or core of the smaller cylindrical filter element. This portion of the air flow passes through both cylindrical filter elements and the perforated element before entering the inflating safety cushion. However, in order to minimize the resistance that the flowing air encounters and to diffuse the first portion of the air flow, the conduit transmits a small portion of the air from the air supply directly into the space between the smaller and larger cylindrical filter elements so that this air need only pass through the larger cylindrical filter element before entering the inflating safety cushion.

BRIEF DESCRIPTION OF THE DRAWINGS

Further objects, features, and advantages of this invention, which is defined by the appended claims, will become apparent from a consideration of the following description and the accompanying drawings in which:

FIG. 1 is a perspective, cutaway view of one embodiment of the filter-muffler apparatus of this invention;

FIG. 2 is a partially cutaway, plan view of an inflatable safety-cushion system that includes the filter-muffler of FIG. 1;

FIG. 3 is an end view of the filter-muffler and housing of FIG. 2 broken away and illustrated from the position defined by line 3—3; and FIG. 4 is a side view of the filter-muffler and housing of FIG. 3 cutaway along line 4—4.

DETAILED DESCRIPTION OF THE PREFERRED EMBODIMENT

FIG. 1 illustrates a filter-muffler 10 comprising inner and outer cylindrical filter elements 12 and 14 which are held in a spaced apart relationship by a hexagonal tube or conduit 16 having a plurality of slot shaped perforations 18 formed therein. The cylindrical filter elements 12 and 14 are radially wound ribbon-edge type filter elements. Ribbon-edge type filters are well known porous cylindrical elements. The filters and one method for forming them are described in my United States Pat. No. 3,496,047 assigned to The Bendix Corporation. The sides of the hexagonal tube 16 cooperate with the inner surface of cylindrical filter element 12 to define a plurality of open spaces or expansion chambers 20 (seen most clearly in FIG. 3) having sufficient size so that the velocity of air passing through perforations 18 will be reduced as that air enters the chambers 20. The noise level of an air flow is reduced as the velocity of that air flow is reduced. The noise level of air flowing through the filter-muffler 10 is thereby reduced as that air passes through perforations 18 to enter the expansion chambers 20.

The hexagonal tube 16 is formed from a material that is sufficiently elastic to be deformed by a short pulse of air flowing through the filter-muffler 10. The tube 16, may, for example, be formed from steel and have a thickness on the order of 1/16 inch. The deflection of the walls of tube 16 absorbs energy from a pulse of air flowing through the filter-muffler 10. This absorption of energy reduces the sound level of the air flow. In addition, the sound level of a pulse or short duration air flow is further reduced by a styrofoam end plug 22 (FIG. 44) which absorbs energy from such an air flow.

The perforations 18 in hexagonal tube 16 comprise narrow slots disposed substantially at 45° to the axis of cylindrical elements 12 and 14. These slots distribute the force or impact of air passing through hexagonal element 16 over a number of the windings of the cylindrical filter 12. Air flow is not directed against only one or two of those windings as would be the case if the slots 18 were disposed parallel to those windings, or in other words perpendicular to the axis of cylindrical filter elements 12 and 14. The 45° disposition of the slots 18 thus distributes the force of flowing air across a large number of the windings of the filter element 12 and thus minimizes the chance that an air flow might rupture that filter element. The 45° disposition of the slots 18 also causes hexagonal tube 16 to have a high radial strength. That is, these slots do not significantly reduce the radial strength of tube 16 as would slots disposed parallel to the axis of cylindrical filter elements 12 and 14. The disposition of slots 18 at approximately 45° to the axis of the muffler 10 thus optimizes the distribution of the force or impact of flowing air across the windings of filter element 12 and the radial strength of hexagonal element 16.

FIG. 2 illustrates a complete inflatable safety cushion device 24 that includes a high pressure air supply 26, an inflatable air bag 28, and a conduit 30 for transmitting air between the supply 26 and bag 28. Gas supply 26 contains a sufficient supply of air to fully inflate bag 28. This supply is maintained under a high pressure so that bag 28 will inflate very quickly. For example, the gas supply 26 may be pressurized to 3000 lb./sq.in. in order to inflate bag 28 in 50 milliseconds. The filter-muffler 10 shown in FIG. 1 is held snugly in a portion 32 of conduit 30 so that air inflating the bag 28 must first flow through the filter-muffler. Bag 28 is cemented or otherwise attached in a substantially leakproof manner to a flange 34 and wrapped around portion 32 of conduit 30 so that air flowing through the filter-muffler 10 inflates that bag. A thin wall or diaphragm 36 separates the gas stored in supply 26 from bag 28. A small explosive charge 38 for rupturing diaphragm 36 to initiate inflation of bag 28 is disposed on one side of that diaphragm. Explosive charge 38 is connected so that it will be triggered by a collision of the vehicle in which the safety device 24 is mounted.

In operation, explosive charge 38 is detonated by a collision of the vehicle in which safety device 24 is mounted. The explosion of this charge ruptures disc 36, which allows air to flow from supply 26 into bag 28. However, fragments of disc 36 are introduced into the air flow. These fragments are removed from the air flow by filter elements 12 and 14 which prevent them from reaching and injuring any vehicle passenger. Air from supply 26 flowing into muffler 10 sees the entire cross section of that muffler illustrated in FIG. 3. The major portion of the air from supply 26 flows into the center of filter 14 which removes metal fragments from the flow. Air flows from the center or core of filter element 14 through that element and through the perforations 18 of tube 16 into expansion chambers 20. Air flowing through the slots or perforations 18 expands upon entering chambers 20. The velocity of an air flow reduces as the air expands. This velocity reduction is accompanied by a reduction in the noise level of the air flow. The air flow also causes hexagonal element 16 to elastically deform. This deformation absorbs energy from the air flow and thus further reduces the noise level of that air flow.

A portion of the air flow from supply 26 does not flow into the center of filter element 14, but instead flows directly into the open spaces or chambers between elements 12 and 14. The filter-muffler 10 provides a large reduction in the noise level of the air flowing from supply 26 into bag 28 even though the entire flow does not pass through elements 14 and 16. The air flowing directly into the area between filter elements 12 and 14 diffuses or disperses the air flowing through filter element 14 and slots 18 and causes air to flow through each portion of filter 12 into bag 28. This dispersion minimizes the possibility that an air flow may cause either filter 12 or bag 28 to rupture. In addition, the flow resistance encountered by air from supply 26 is minimized because all air from that supply is not required to flow through all three elements 12, 14, and 16. Filter element 12 removes any metal fragments or other particles from the air flow that does not pass through element 14 so that no metal fragments are allowed to reach or injure a passenger.

Having thus described one embodiment of this invention, a number of modifications will occur to those skilled in the art. Therefore, what is claimed is:

1. A device for providing a filtered gaseous flow having a low noise level comprising:
 a first cylindrical filter element for receiving and removing particles from said gaseous flow;
 a second cylindrical filter element encircling said first filter element, said second filter element having sufficient strength to withstand a predetermined gas flow and an inner diameter larger than the outer diameter of said first element;
 a multi-sided, perforated element disposed between said first and second cylindrical filter elements maintaining said filter elements in a spaced relationship with respect to each other, the sides of said perforated element cooperating with the surface of at least one of said filter elements to define a plurality of expansion chambers for receiving gaseous flow passing through the perforations of said perforated element, the velocity and thereby the noise level of said gaseous flow being reduced upon entering said expansion chambers; and
 end closure means for directing received gas flow in a radial direction through said cylindrical and multi-sided elements.

2. The device of claim 1 in which said multi-sided element is formed from an elastic material that is deflected by a short duration gaseous flow, said deflection absorbing energy and thereby further reducing the noise level of said short duration flow.

3. The device of claim 2 in which:
 said first filter element and said second cylindrical element each comprise radially would ribbon-edge type filter elements; and
 the perforations in said perforated element comprise narrow slots disposed at substantially 45° to the axis of said cylindrical elements, said 45° disposition of said slots optimizing the radial strength of said perforated element and the distribution across the surface of one of said cylindrical filter elements of the force of the gaseous flow passing through said slots.

4. The device of claim 3 wherein said end closure means comprises a deformable end plug disposed at one end of said first cylindrical filter element to absorb energy from said short duration gaseous flow and thereby reduce the noise level of said flow.

5. A device for providing a filtered gaseous flow having a low noise level comprising:
- a first cylindrical filter element for receiving and removing particles from said gaseous flow;
- a second cylindrical filter element encircling said first filter element, said second filter element having an inner diameter larger than the outer diameter of said first element;
- a multi-sided, perforated element disposed between said first and second cylindrical filter element for maintaining said filter element in a spaced relationship with respect to each other, the sides of said perforated element cooperating with the surface of at least one of said filter elements to define said plurality of expansion chambers for receiving gaseous flow passing through the perforations of said perforated element, the velocity and thereby the noise level of said gaseous flow being reduced upon entering said expansion chambers;
- end closure means for directing gas flow in a radial direction through said cylindrical and multi-sided elements; and
- housing means having a predetermined strength for containing said cylindrical and said multi-sided elements.

* * * * *